United States Patent
Beck et al.

[15] 3,706,928
[45] Dec. 19, 1972

[54] COHERENT FREQUENCY MULTIPLIER AND ENCODER

[72] Inventors: Emanuel A. Beck, Silver Spring; Arthur J. Bassnett, Lewisdale, both of Md.

[73] Assignee: The United States of America as represented by the Secretary of the Navy

[22] Filed: Nov. 12, 1964

[21] Appl. No.: 410,817

[52] U.S. Cl. .................... 325/33, 325/137, 325/122, 331/179
[51] Int. Cl. ............................................. H03b 25/00
[58] Field of Search ......... 343/18 E, 17.1, 17.2, 17.5, 343/14; 307/88.5; 325/33, 39, 40, 50, 137, 163, 122; 331/179; 178/22; 328/152, 153, 154; 333/7

[56] References Cited

UNITED STATES PATENTS

| | | |
|---|---|---|
| 2,423,082 | 7/1947 | Busignier ..................... 343/17.1 UX |
| 2,542,183 | 2/1951 | Edwards ........................... 325/33 X |
| 2,923,004 | 1/1960 | Warneche ........................... 343/14 |
| 3,029,310 | 4/1962 | Heiser ............................ 328/154 X |
| 3,163,862 | 12/1964 | Jenny ............................. 343/17.2 X |
| 3,396,392 | 8/1968 | Fishbein et al .................. 343/17.2 R |
| 3,548,341 | 12/1970 | Berry ................................ 331/179 |

Primary Examiner—Benjamin A. Borchelt
Assistant Examiner—H. A. Birmiel
Attorney—J. P. Dunlavey and J. O. Tresansky

[57] ABSTRACT

The present invention provides a signal generator capable of producing randomly selected coherent output frequencies. Specifically, the proposed generator comprises a first section which generates a carrier frequency, and a second section, containing a chain of frequency multipliers, which is capable of producing a plurality of coherent modulating frequencies. The carrier frequency is first selectively modulated with random ones of the plurality of modulating frequencies to produce high and low sideband and the high and low sidebands are then selectively connected to the output of the generator by a random code.

5 Claims, 3 Drawing Figures

EMANUEL A. BECK
ARTHUR J. BASSNETT
INVENTORS

BY
Claude Funkhouser
ATTORNEY

EMANUEL A. BECK
ARTHUR J. BASSNETT
INVENTORS

BY
Claude Funkhouser
ATTORNEY

COHERENT FREQUENCY MULTIPLIER AND ENCODER

The present invention relates generally to high frequency generators and, more particularly, to a microwave generator for producing a plurality of coherent frequencies.

The present invention was designed for use in the complex weapons system of a target seeking missile. The overall weapons system includes a multiple beam radar which operates in a countermeasures environment by randomly varying its pulse transmitting frequency. Such a radar requires a microwave signal generator which will provide a plurality of coherent frequencies. In addition, the signal generator must be capable of rapidly and randomly switching from one coherent frequency output to another.

The present invention utilizes the output of a stable oscillator, which is converted to a plurality of coherent frequencies, in a VHF section containing a chain of frequency multipliers. The outputs of the multipliers are randomly gated by a matrix to one input of a modulator. The other input of the modulator receives a carrier signal from a UHF section, which is modulated with a random one of the output frequencies. The output of the modulator is applied to the input terminals of parallel connected high and low sideband filters. Each branch of the parallel connection also contains a switch which is selectively operated by the matrix. The switches and the filters in combination permit either the high or the low sideband output wave from the modulator to be selectively transferred to the output of the generator.

It is, therefore, an object of the present invention to provide a signal generator which produces a plurality of coherent frequencies.

Another object of the present invention is to provide a multiple frequency signal generator having an output which may be rapidly switched from one frequency to another in a random manner.

Other objects and many of the attendant advantages of this invention will be readily appreciated as the same becomes better understood by reference to the following detailed description when considered in connection with the accompanying drawings, wherein.

Figure 1:
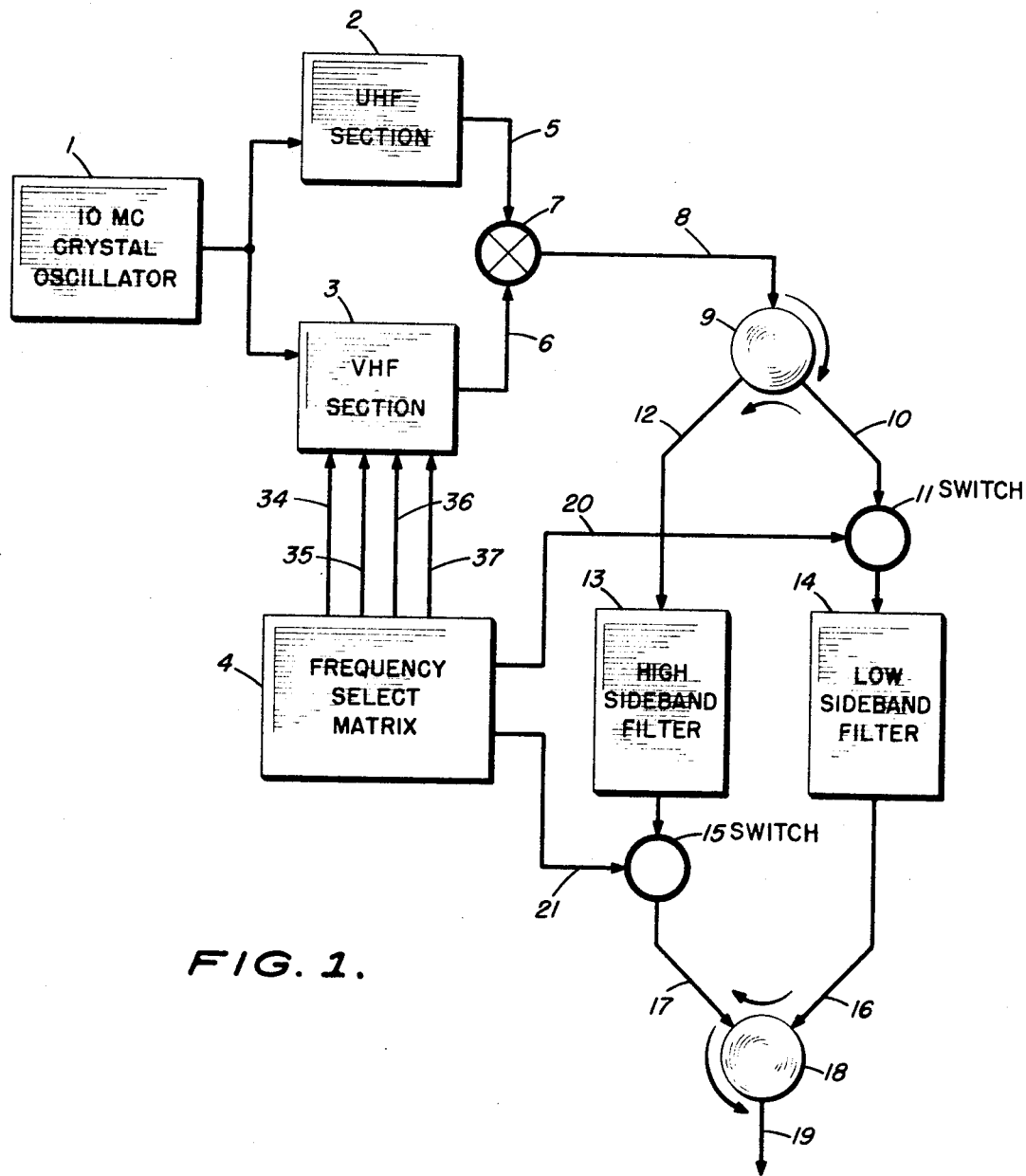
FIG. 1 is a block diagram of the present invention.

Referring now to FIG. 1, a crystal stabilized oscillator 1 has its output connected to the inputs of a UHF section 2 and a VHF section 3. Also connected to the VHF section are the output leads of a frequency select matrix 4. The matrix 4 provides output pulses randomly over its output leads, such a matrix being well-known and therefore not described in detail. The outputs of the UHF section 2 and the VHF section 3 are connected by conductors 5 and 6, respectively, to the inputs of a suppressed carrier modulator 7. The VHF section provides random pulses to the modulator 7, which produces a high and a low sideband output, hereafter called the high and low outputs, respectively. Both of these outputs are applied to the input port 8 of the circulator 9, the carrier being suppressed in the modulator and not appearing in its output.

One of the output ports 10 of the circulator is connected to a switch 11, and the other output port 12 is connected to a high sideband filter 13. The switch 11 is connected in series with a low sideband filter 14, while the filter 13 is connected in series with a switch 15. The outputs of the filter 14 and the switch 15 are connected to the input ports 16 and 17, respectively, of a circulator 18. The output port 19 of the circulator is applied over a suitable conductor to the radar transmitter of the weapons system. The frequency select matrix has two additional output leads 20 and 21 for applying random pulses to the switches 11 and 15, respectively.

Assuming that the generator is to provide the low output at the port 19, the diode of the switch 11 is biased to cutoff and the diode of switch 15 is biased to conduction. The high and low outputs from the modulator both radiate from the port 10 of the circulator, as indicated by the arrow, to the switch 11. If the diode of switch 11 is biased to its cutoff state, both the high and low outputs will be applied to the input of the filter 14. The filter 14 will pass only the low output and will dissipate the high output. The low output will then enter the port 16 of the circulator 18 and radiate, as indicated by the arrow, from the port 17. This radiated output will then be reflected from the switch 15, as its diode is biased to conduction by the matrix. The low output will reenter the circulator 18 through the port 17 and radiate from the port 19 to the load.

If the generator is to provide the high output, the diode of the switch 11 is biased to conduction and the diode of the switch 15 is biased to cutoff. Both outputs will be radiated from the port 10 of the circulator and reflected by the conductivity biased diode of the switch 11. The reflected outputs will reenter the port 10 and radiate from the port 12 to the high sideband filter 13. The high output will pass, in turn, through the filter 13, the switch 15, the input port 17 of the circulator 18, to the output port 19. The low output will be dissipated in the filter 13 and will not appear at the output port 19.

Figure 2:
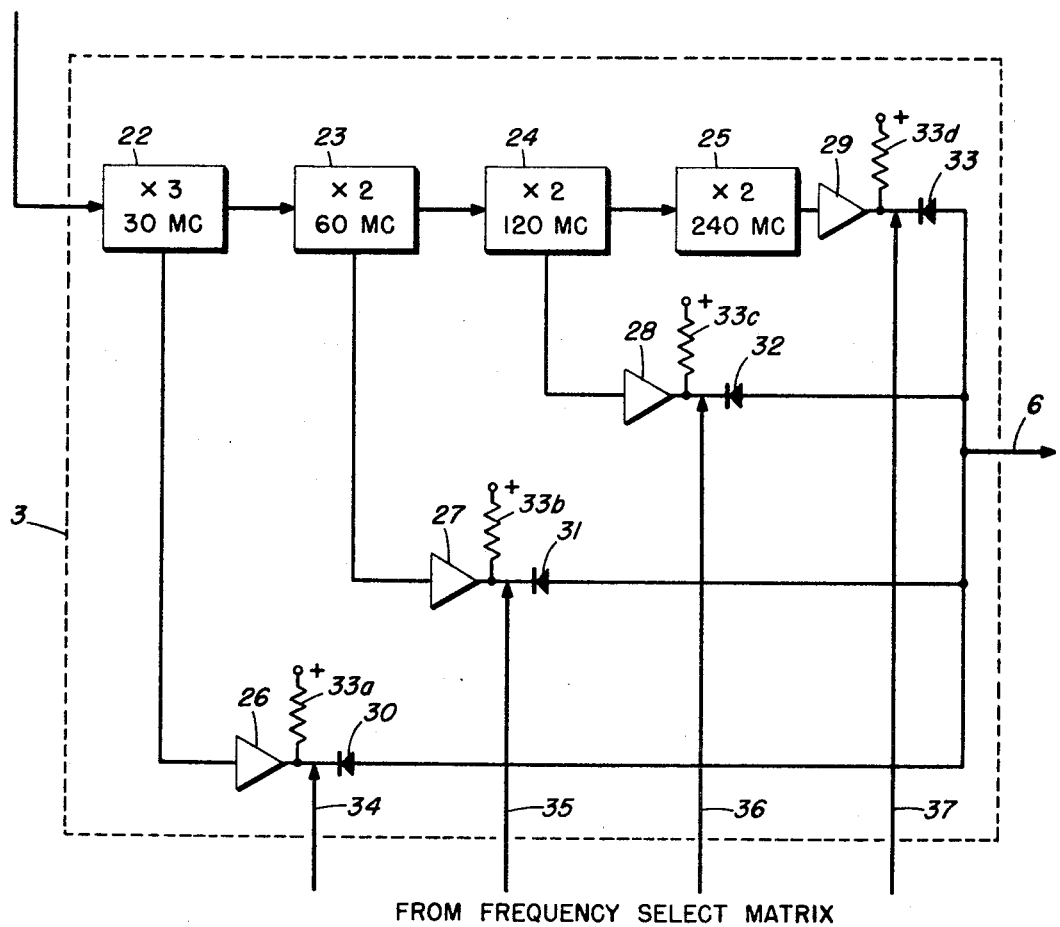
FIG. 2 is a schematic diagram of the VHF section of FIG. 1.

Referring now to FIG. 2, the operation of the VHF section 3 (outlined in dashed lines) may be understood. The oscillator 1 which has been shown as having a 10 megacycle output, so as to be compatible with conventional radar systems, is connected to a chain of frequency multipliers 22–25. The multipliers are of conventional design and provide coherent outputs of 30 mcs, 60 mcs, 120 mcs and 240 mcs, respectively. The outputs of the multipliers are connected to amplifiers 26–29, respectively. The amplifiers 26–29 are connected through varactor diodes 30–33 to the output lead 6. The diodes 30–33 are normally biased to their cutoff state by a positive bias level applied, through resistors 33a, 33b, 33c, and 33d, respectively, to their cathodes.

Referring again to FIG. 1, the output leads 34–37 of the frequency select matrix are also connected to the cathodes of each of the varactor diodes. Assume, for example, that a random negative pulse from the matrix is applied by the lead 35 to the normally reverse biased diode 31. The negative pulse is made of sufficient amplitude to forward bias the diode 31 and cause the 60 mc signal from the multiplier 23 to appear on the lead 6. The reverse biased diodes 30, 32, and 33 will remain in the non-conducting state and isolate their associated amplifiers from the pulse applied to the lead 6. The outputs from the other multipliers are applied to the lead 6 by random pulses from the matrix which similarly forward bias the associated varactor diode.

Figure 3:
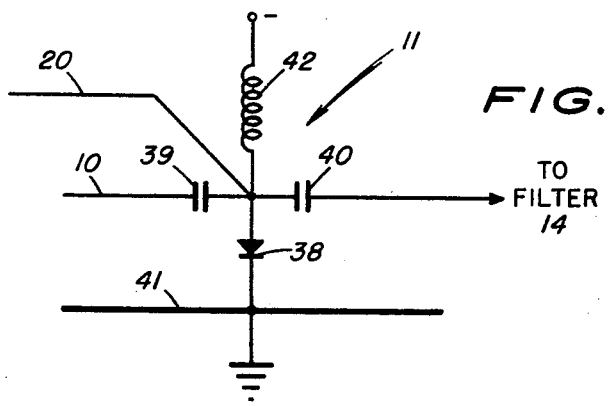
FIG. 3 is a schematic diagram of one of the switches of FIG. 1.

FIG. 3 is a schematic diagram of the switch 11 of FIG. 1 switch 15 being identical in arrangement and operation. Switch 11 contains a solid state diode 38, having its anode connected to the output port 10 through a capacitor 39 and to the filter 14 through a capacitor 40. The cathode of the diode is connected to a ground plane 41. The diode 38 is normally biased to cutoff by a negative voltage source applied through an inductance 42 to its anode. The two capacitors 39 and 40 isolate the output of the matrix from both the input and the output signals, and the inductance 42 isolates the negative bias supply from the high frequency input and output signals.

In order to understand the operation of the switch, assume that a positive pulse is applied over the lead 20 to forward bias the diode 38. When the diode conducts, the input signal is short circuited to the ground plane. The short circuit presents a zero impedance to the input signal and reflects it towards the source. The switch, therefore, is effectively open as no current passes through it. If, however, the diode 38 is biased to cutoff, the path between the input lead and the ground plane will be open circuited. The impedance of the shunt path across the diode approaches infinity, and the input signal will pass through the switch. Thus, the switch is effectively closed as the input signal will not be reflected thereby.

Obviously, many modifications and variations of the present invention are possible in the light of the above teachings. It is therefore to be understood that within the scope of the appended claims the invention may be practiced otherwise than as specifically described.

What is claimed is:

1. In a signal generator,
   generating means for providing signals of differing frequencies,
   a modulator,
   selecting means for randomly selecting one of the signals from said generating means and applying said selected signal to said modulator,
   means for applying a carrier wave to said modulator to provide a high sideband and a low sideband signal from said modulator, and
   switching means for randomly allowing either of said high sideband or said low sideband signal to pass therethrough.

2. The signal generator of claim 1, in which the signals provided by said generating means are coherent.

3. The signal generator of claim 1, in which said selecting means is a matrix having output signals randomly applied to its output leads.

4. A signal generator comprising,
   a modulator for providing a signal having a high sideband and a low sideband output,
   a three port circulator having its first port connected to the output of said modulator,
   a first switch connected to the second port of said circulator,
   a high sideband filter connected to the third port of said circulator,
   a low sideband filter connected in series with said first switch,
   a second switch connected in series with said high sideband filter,
   a load connected to both said second switch and said low sideband filter, and
   means for randomly closing either of said switches, whereby the closing of said first switch causes the low sideband output of said modulator to appear across said load and the closing of said second switch causes the high sideband output of said modulator to appear across said load.

5. The signal generator of claim 4 in which the means for randomly closing said switches is a matrix for randomly providing output pulses to said switches.

* * * * *